(12) United States Patent
Teranishi (10) Patent No.: US 10,227,083 B2
(45) Date of Patent: Mar. 12, 2019

(54) WORK VEHICLE

(71) Applicant: KOMATSU LTD., Tokyo (JP)

(72) Inventor: Yuichi Teranishi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 117 days.

(21) Appl. No.: 15/108,354

(22) PCT Filed: Mar. 31, 2016

(86) PCT No.: PCT/JP2016/060675
§ 371 (c)(1),
(2) Date: Jun. 27, 2016

(87) PCT Pub. No.: WO2016/137018
PCT Pub. Date: Sep. 1, 2016

(65) Prior Publication Data
US 2017/0282961 A1    Oct. 5, 2017

(51) Int. Cl.
| | | |
|---|---|---|
| B62D 5/04 | (2006.01) | |
| B62D 1/22 | (2006.01) | |
| E02F 9/24 | (2006.01) | |
| E02F 9/08 | (2006.01) | |
| E02F 9/20 | (2006.01) | |
| E02F 3/34 | (2006.01) | |
| E02F 9/16 | (2006.01) | |

(52) U.S. Cl.
CPC .............. B62D 1/22 (2013.01); E02F 9/0841 (2013.01); E02F 9/2004 (2013.01); E02F 9/24 (2013.01); E02F 3/34 (2013.01); E02F 9/16 (2013.01)

(58) Field of Classification Search
CPC .................................... B62D 1/22; B62D 5/04

USPC ............... 180/326, 329, 330, 331, 333, 334
See application file for complete search history.

(56) References Cited

U.S. PATENT DOCUMENTS

| | | | | |
|---|---|---|---|---|
| 3,347,558 A | * | 10/1967 | Grimes | B60N 2/143 |
| | | | | 180/329 |
| 4,821,837 A | * | 4/1989 | Fifer | B62D 1/18 |
| | | | | 180/315 |
| 6,095,944 A | | 8/2000 | Buchanan et al. | |
| 7,954,592 B2 | * | 6/2011 | Miyazaki | E02F 9/2004 |
| | | | | 180/305 |
| 2006/0137931 A1 | * | 6/2006 | Berg | B62D 1/12 |
| | | | | 180/333 |
| 2008/0277190 A1 | * | 11/2008 | McCord | B62D 1/12 |
| | | | | 180/444 |

(Continued)

FOREIGN PATENT DOCUMENTS

| | | | |
|---|---|---|---|
| EP | 1 693 282 A1 | 8/2006 | |
| EP | 3 056 407 B1 | 8/2016 | |

(Continued)

OTHER PUBLICATIONS

The Office Action for the corresponding Chinese application No. 201680000553.4, dated Jun. 20, 2017.

(Continued)

*Primary Examiner* — Tony H Winner
(74) *Attorney, Agent, or Firm* — Global IP Counselors, LLP (57) ABSTRACT

A controller disables the motion of a steering cylinder brought about by a steering lever when an enabled state is selected via a lever switch and an instruction to start an engine is issued via a main switch.

7 Claims, 7 Drawing Sheets

(56) References Cited

U.S. PATENT DOCUMENTS

2014/0138166 A1* 5/2014 Otto .................. B62D 1/22
                                                    180/6.48

FOREIGN PATENT DOCUMENTS

| JP | 2000-104291 A | 4/2000 |
| JP | 2002-115277 A | 4/2002 |
| WO | 2014/181893 A1 | 11/2014 |

OTHER PUBLICATIONS

The extended European search report for the corresponding European application No. 16727928.0, dated Jun. 4, 2018.
The International Search Report for the corresponding international application No. PCT/JP2016/060675, dated Jun. 7, 2016.

* cited by examiner

WORK VEHICLE

CROSS-REFERENCE TO RELATED APPLICATIONS

This application is a U.S. National stage application of International Application No. PCT/JP2016/060675, filed on Mar. 31, 2016.

BACKGROUND

Field of the Invention

The present invention relates to a work vehicle.

Conventionally, a steering lever is provided in a work vehicle, such as a wheel loader, for efficient steering operation during long-distance travel and work for repeating steering operations in addition to a steering wheel for steering operation during travel on public roads or at a work site.

In this case, the provision of a plurality of types of switches has been proposed for enabling lever operations for the purpose of preventing a malfunction of the steering lever.

SUMMARY

However, although malfunctions of the steering lever are certainly suppressed as the number of types of switches increases in the method in International Publication WO 2014/181893, there is a problem that the operator is not able to understand the reason that a lever operation cannot be enabled and becomes confused because the conditions for enabling the lever operations are complicated.

In consideration of the above problem, an object of the present invention is to provide a work vehicle in which malfunctions of the steering lever can be suppressed in a simple manner.

A work vehicle according to a first exemplary embodiment of the present invention is equipped with a steering lever, an engine, a main switch, a rear frame, a front frame, a steering actuator, a lever switch, and a lever steering control unit. The main switch is configured to instruct an engine start. The front frame is attached to the rear frame in a rotatable manner. The steering actuator is attached between the front frame and the rear frame and is caused to move in response to an operating state of the steering lever. The lever switch is configured to allow the selection of either an enabled state or a disabled state of a motion of the steering actuator brought about by the steering lever. The lever steering control unit is configured to set the motion of the steering actuator brought about by the steering lever to the disabled state when the enabled state is selected via the lever switch and instructs the engine start via the main switch.

According to the work vehicle as in the first exemplary embodiment of the present invention, the occurrence of a malfunction due to the steering lever during the engine start can be suppressed because the motion of the steering actuator brought about by the steering lever can be set to the disabled state when an engine start instruction is issued. Moreover, because only the engine start is used as a trigger and the traveling state of the work vehicle or the operating state of the engine and the like do not need to be monitored, the disabling of the steering lever can be performed easily.

The work vehicle according to a second exemplary embodiment of the present invention is related to the first exemplary embodiment, and the main switch is configured to allow the selection of any of a first position in which electrical power is not supplied to the lever steering control unit, a second position in which electrical power is supplied to the lever steering control unit, or a third position for instructing the engine start. When the engine is stopped while the enabled state is selected via the lever switch, the lever steering control unit disables the motion of the steering actuator brought about by the steering lever when the main switch is switched from the second position to the third position.

The work vehicle according to a third exemplary embodiment of the present invention is related to the second exemplary embodiment, and when the engine is stopped while the enabled state is selected via the lever switch, the lever steering control unit maintains the motion of the steering actuator brought about by the steering lever in the enabled state until the main switch is switched from the second position to the third position.

According to the work vehicle as in the third exemplary embodiment of the present invention, operability while traveling can be improved because steering using the steering lever is made possible while the work vehicle is traveling with inertia after the engine has stopped.

The work vehicle according to a fourth exemplary embodiment of the present invention is related to the second or third exemplary embodiment, and when the lever steering control unit receives a signal for instructing the engine start, the lever steering control unit stops the output of a motion instruction to the steering actuator corresponding to an operation of the steering lever.

The work vehicle according to a fifth exemplary embodiment of the present invention is related to the second or third exemplary embodiment, and is provided with a battery connected to the main switch. The lever steering control unit is provided with a relay circuit that, when the main switch is switched from the second position to the third position, shuts off electrical power supplied from the battery.

According to the work vehicle as in the fifth exemplary embodiment of the present invention, there is no need to use the lever steering control unit to separately disable the steering lever because the steering lever is automatically disabled by the relay circuit when the instruction for the engine start is issued.

According to exemplary embodiments of the present invention, a work vehicle can be provided that can suppress malfunctions of the steering lever in a simple manner.

DESCRIPTION OF EXEMPLARY EMBODIMENTS

First Exemplary Embodiment

Configuration of Wheel Loader 1

Figure 1:
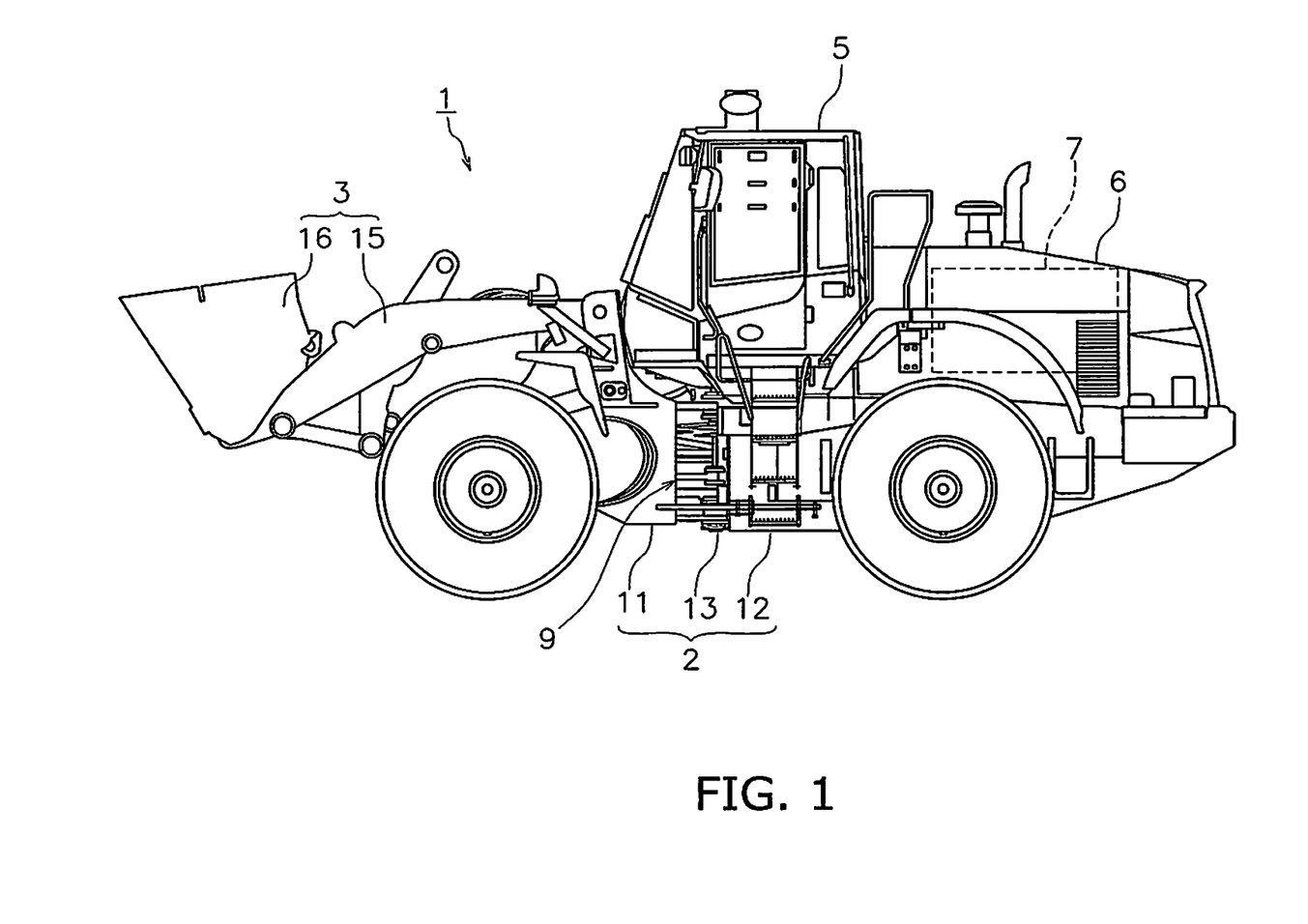
FIG. 1 is side view of the overall configuration of a wheel loader.
Figure 2:
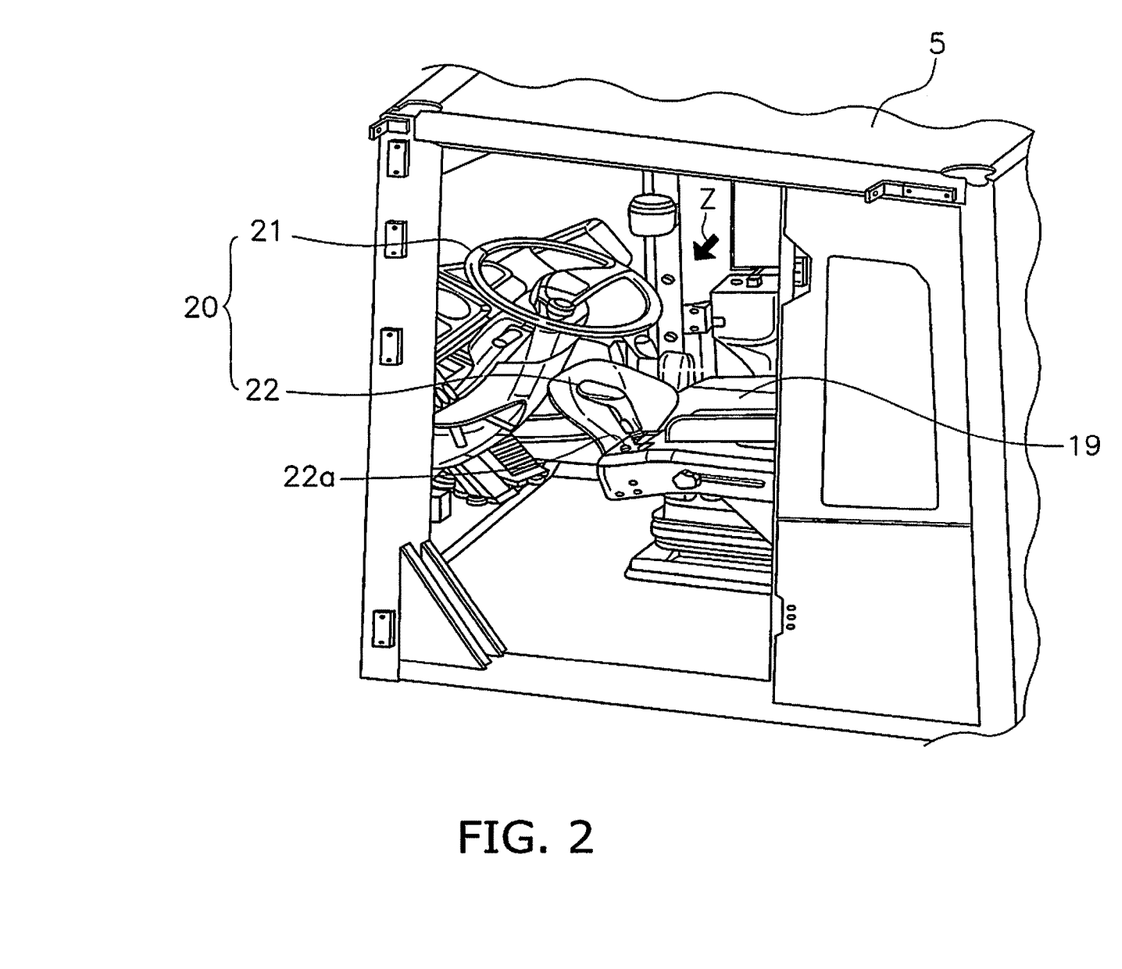
FIG. 2 is a perspective view for explaining the internal configuration of an operating cabin.
Figure 3:
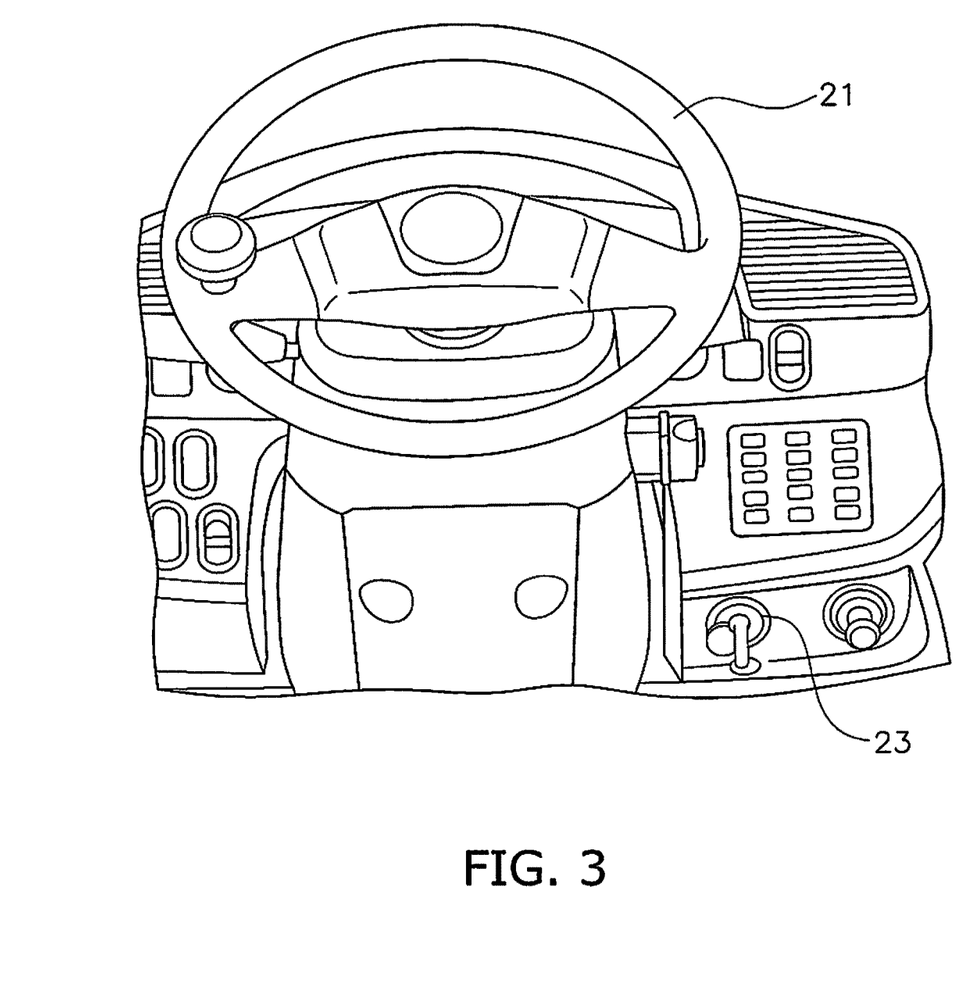
FIG. 3 is a perspective view seen from the direction indicated by the arrow Z in FIG. 2.

FIG. 1 is a side view of an overall configuration of a wheel loader 1 according to the present exemplary embodiment. FIG. 2 is a perspective view for explaining the internal configuration of an operating cabin 5. FIG. 3 is a perspective view seen from the direction indicated by the arrow Z in FIG. 2.

As illustrated in FIG. 1, the wheel loader 1 is equipped with a vehicle body frame 2, a work implement 3, the operating cabin 5, an engine room 6, and an engine 7.

The vehicle frame 2 is a so-called articulated construction and includes a front frame 11, a rear frame 12, and a coupling part 13. The front frame 11 is arranged in front of the rear frame 12. The front frame 11 is attached via the coupling part 13 to the rear frame 12 in a rotatable manner.

A steering cylinder (steering actuator) 9 is attached between the front frame 11 and the rear frame 12. The front frame 11 is provided in a manner that allows rotation with respect to the rear frame 12 due to the extension and contraction of the steering cylinder 9. The steering cylinder 9 is provided in a manner that allows extension and contraction due to the operation of a steering wheel 21 (FIGS. 2 and 3) and a steering lever 22 (FIG. 2) provided inside the operating cabin 5.

The operating cabin 5 and the engine room 6 are mounted on the rear frame 12. The engine 7 is contained inside the engine room 6. The rotation speed of the engine 7 is detected by an engine rotation speed sensor 24 (see FIG. 5). A controller 10 receives the engine rotation speed detected by the engine rotation speed sensor 24 (see FIG. 5).

The work implement 3 has a lift arm 15 and a bucket 16. The lift arm 15 and the bucket 16 are driven by hydraulic oil supplied by a hydraulic pump, which is not illustrated. The proximal end of the lift arm 15 is rotatably supported on the front frame 11. The bucket 16 is rotatably attached to a distal end part of the lift arm 15.

As illustrated in FIGS. 2 and 3, an operator seat 19, a steering device 20, and a main switch (key switch) 23 are provided in the operating cabin 5. The operator seat 19 is a seat for an operator who has entered the operating cabin 5 to sit in order to perform driving operations. The steering device 20 is a device for steering the vehicle by rotating the front frame 11 with respect to the rear frame 12. When the steering device 20 is steered, the steering cylinder 9 is driven in response to the steering. Consequently, the wheel loader 1 turns to the right or left in response to the steering of the steering device 20. The steering device 20 includes the steering wheel 21 and the steering lever 22.

The steering wheel 21 is arranged in front of the operator seat 19. The steering wheel 21 can be rotated while the operator is sitting. The steering wheel 21 is mainly used for steering during high-speed travel on public roads or at a work site.

The steering lever 22 is arranged at the side of the operator seat 19. The steering lever 22 is mainly used for steering during short-distance travel and work that involves repeating steering operations. The steering lever 22 can be tilted to the right and left while the operator is sitting. The steering lever 22 transmits a steering instruction signal corresponding to the tilting by the operator to the below-mentioned controller 10 (see FIG. 5). That is, the steering cylinder 9 is moved in response to the operating state of the steering lever 22.

A lever switch 22a for the operator to switch between an enabled state and a disabled state of the steering lever 22 is provided in the proximity of the left side of the steering lever 22. The lever switch 22a allows the selection of the enabled state or the disabled state of the motion of the steering cylinder 9 brought about by the steering lever 22. While a press button switch or a tactile switch may be used for the lever switch 22a, the lever switch 22a is not limited to these types of switches.

An instruction to disable the steering lever 22 is transmitted to the controller 10 when the lever switch 22a is pressed while the steering lever 22 is in the enabled state while electrical power is supplied to the controller 10. An instruction to enable the steering lever 22 is transmitted to the controller 10 when the lever switch 22a is pressed while the steering lever 22 is in the disabled state while electrical power is supplied to the controller 10. The operator presses the lever switch 22a when the operator wants to steer via the steering lever 22, and presses the lever switch 22a again when the operator wants to finish steering via the steering lever 22.

Figure 4:
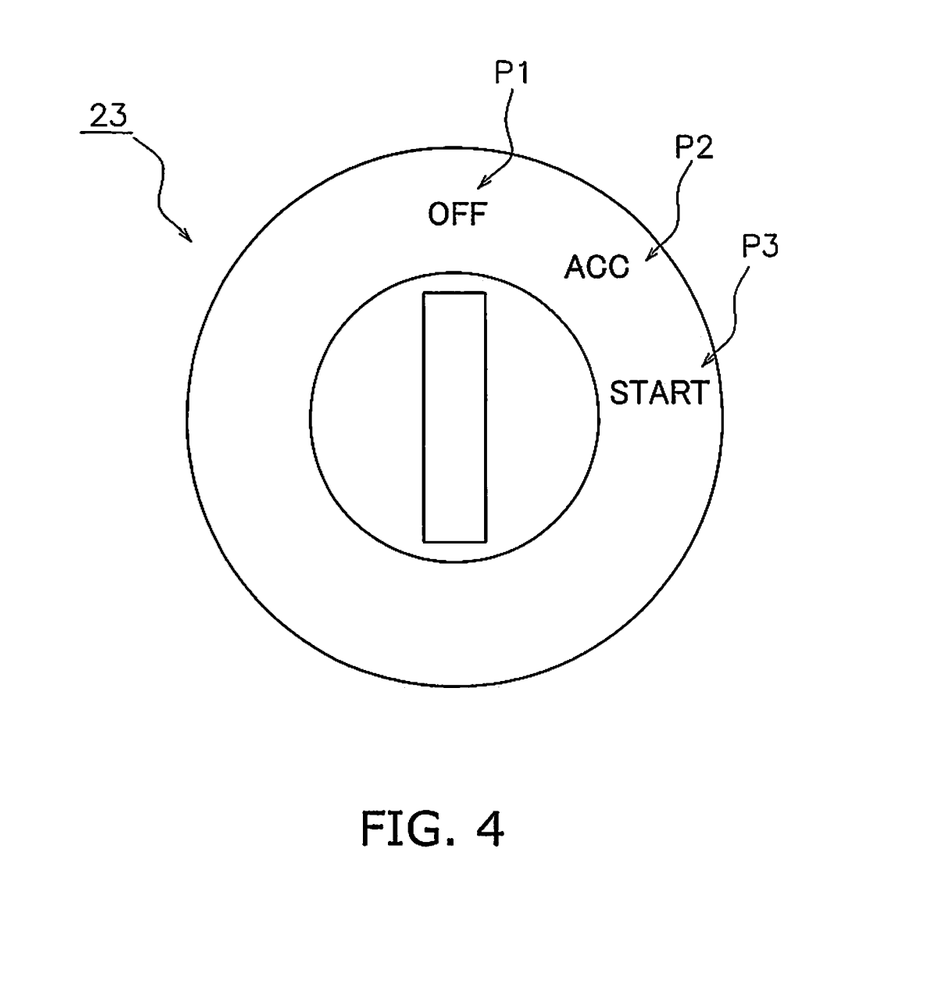
FIG. 4 is a front elevational view of a main switch.

The main switch 23 is arranged beside the steering wheel 21. The main switch 23 allows an instruction to be issued to the controller 10 to start the engine 7 and the like due to the insertion and operation of a key. FIG. 4 is a front elevational view of the main switch 23. The main switch 23 can be switched between a first position P1, a second position P2, and a third position P3.

When the main switch 23 is in the first position P1, electrical power for various electrical apparatuses from a battery 8 (see FIG. 5) of the wheel loader 1 is shut off. The controller 10 does not operate when the main switch 23 is in the first position P1. When the main switch 23 is in the second position P2, electrical power for the various electrical apparatuses is supplied from the battery 8. The controller 10 operates when the main switch 23 is in the second position P2. When the main switch 23 is in the third position P3, a starter motor 7b (see FIG. 5) of the engine 7 is operated and the engine 7 starts. When the engine 7 starts, the main switch 23 switches from the third position P3 to the second position P2. The engine 7 turns off when the main switch 23 is switched from the second position P2 to the first position P1 while the engine 7 is running.

Control by the Controller 10

Figure 5:
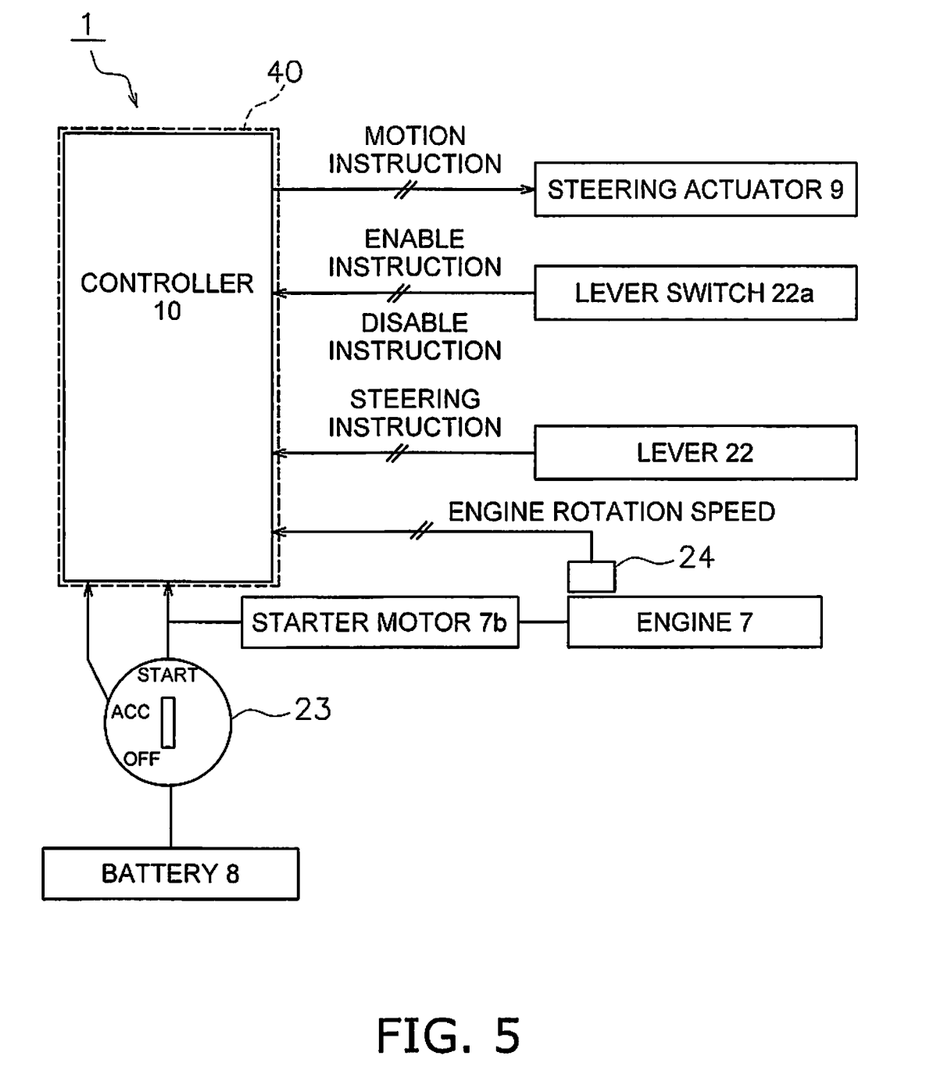
FIG. 5 is a block diagram illustrating the configuration of the wheel loader according to a first exemplary embodiment.

FIG. 5 is a block diagram for illustrating a configuration of the wheel loader 1.

When the main switch 23 is switched from the first position P1 to the second position P2, electrical power is supplied from the battery 8 to the various types of electrical apparatuses including the controller 10 and the steering lever 22 and then the electrical apparatuses can operate.

When the electrical power is supplied to the controller 10, the controller 10 receives an instruction for enabling the steering lever 22 from the lever switch 22a and enables the steering lever 22. The enabling of the steering lever 22 signifies a state of the controller 10 receiving an instruction for steering from the steering lever 22 and the controller 10 controlling the steering cylinder 9 in response to the steering instruction. Therefore, when the steering lever 22 is enabled, the steering instruction from the steering lever 22 is transmitted through the controller 10 to the steering cylinder 9 as a motion instruction. Specifically, the controller 10 supplies an electric current corresponding to the motion instruction to an electromagnetic valve to supply hydraulic fluid to the steering cylinder 9 in order to cause the steering cylinder 9 to move.

When the electrical power is supplied to the controller 10, the controller 10 receives an instruction for disabling the steering lever 22 from the lever switch 22*a* and then disables the steering lever 22. The disabling of the steering lever 22 signifies a state of the controller 10 not receiving a steering instruction from the steering lever 22 or the controller 10 not controlling the steering cylinder 9 even though the controller 10 receives a steering instruction. Therefore, when the steering lever 22 is disabled, the steering instruction from the steering lever 22 is disabled by the controller 10.

When the engine 7 is stopped due to the main switch 23 being switched from the second position P2 to the first position P1 (normal stop), the supply of electrical power to the controller 10 is stopped and consequently the steering lever 22 is disabled regardless of whether the steering lever 22 is in the enabled state or in the disabled state before the engine 7 is stopped.

When the engine 7 is stopped with the main switch 23 remaining in the second position P2 (abnormal stop), because the supply of electrical power to the controller 10 is continued and consequently, the enabled state of the steering lever 22 is maintained if the steering lever 22 was in the enabled state before the engine 7 was stopped, and the disabled state of the steering lever 22 is maintained if the steering lever 22 was in the disabled state before the engine 7 was stopped. An example of the engine 7 stopping while the main switch 23 remains in the second position P2 includes, for example, a failure of the engine 7. When the enabled state of the steering lever 22 is maintained after the engine 7 has stopped, steering with the steering lever 22 is possible if the hydraulic pump is being driven by the rotary drive of the wheels of the vehicle. However, if the wheel loader 1 has stopped and the oil pressure is not being driven, steering via the steering lever 22 is impossible even if the steering lever 22 is in the enabled state.

The controller 10 disables the lever switch 22*a* when the main switch 23 is switched from the second position P2 to the third position P3. That is, the controller 10 disables the motion of the steering cylinder 9 brought about by the steering lever 22 when the start of the engine 7 is instructed via the main switch 23.

Therefore, after the main switch 23 is switched from the second position P2 to the first position P1 and the engine 7 is stopped (normal stop), the controller 10 disables the steering lever 22 when the main switch 23 is switched from the first position P1 through the second position P2 to the third position P3 and the engine 7 is started.

Moreover, after the engine 7 is stopped while the main switch 23 remains in the second position P2 (abnormal stop), the controller 10 also disables the steering lever 22 when the main switch 23 is switched from the second position P2 to the third position P3 and the engine 7 is started.

However, after the engine 7 is stopped while the main switch 23 remains in the second position P2, the controller 10 maintains the steering lever 22 in the enabled state during the time that the main switch 23 is switched from the second position P2 to the third position P3. As a result, when the steering lever 22 is enabled before the start of the engine 7, the controller 10 continues to output the motion instruction to the steering cylinder 9 in response to the steering of the steering lever 22. However, when the controller 10 receives a signal from the main switch 23 for instructing the engine 7 to start, the output of the motion instruction to the steering cylinder 9 in response to the steering of the steering lever 22 is stopped.

The controller 10 in the present exemplary embodiment is configured by the lever steering control unit 40. As described above, the lever steering control unit 40 disables the motion of the steering cylinder 9 brought about by the steering lever 22 when the enabled state is selected by the lever switch 22*a* and the start of the engine 7 is instructed by the main switch 23.

Enabled and Disabled States of Steering Lever 22

Figure 6:
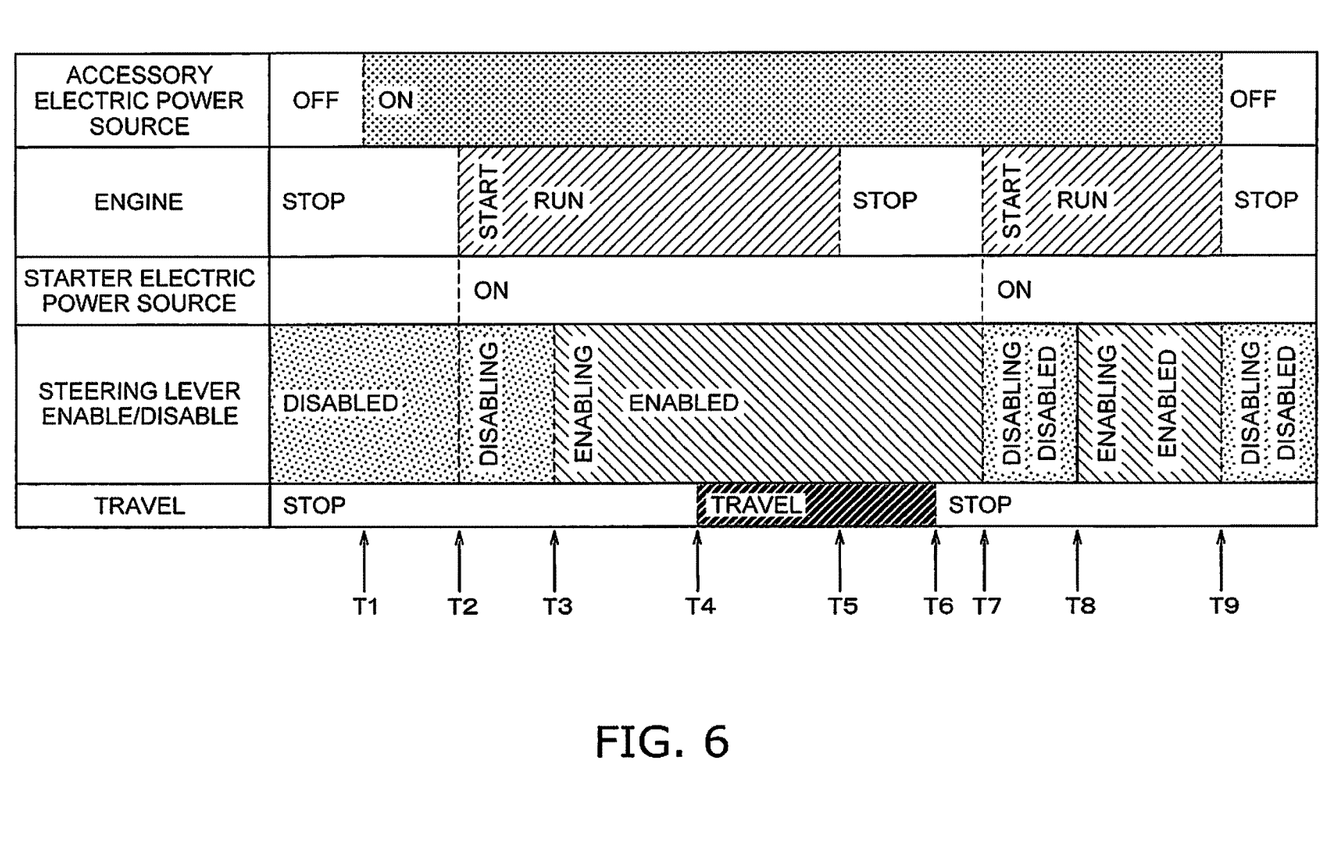
FIG. 6 is a schematic view for explaining the relationship between the operating state of the wheel loader and enabled and disabled states of the steering lever.

FIG. 6 is a schematic view for explaining the relationship between the operating state of the wheel loader 1 and the enabled and disabled states of the steering lever 22.

First, the main switch 23 is switched from the first position P1 to the second position P2 at the time T1. At this time, although the electrical power is supplied to the controller 10, the steering lever 22 is disabled.

Next, the main switch 23 is switched from the second position P2 to the third position P3 and consequently the engine 7 starts at the time T2. At this time, although the steering lever 22 is disabled, the controller 10 disables the steering lever 22. The main switch 23 automatically returns from the third position P3 to the second position P2.

Next, the steering lever 22 is enabled in response to the lever switch 22*a* being pressed at the time T3. The wheel loader 1 then begins to travel at the time T4.

Next, the engine 7 abnormally stops at the time T5 due to a reason unforeseen by the operator. The wheel loader 1 continues to travel due to inertia. At this time, the steering lever 22 is maintained in the enabled state. As a result, steering of the steering lever 22 is possible up to the time T6 because the hydraulic pump is being driven due to the rotary drive of the vehicle wheels until the wheel loader 1 stops at the time T6. After the wheel loader 1 has stopped at the time T6, steering by the steering lever 22 is impossible because the hydraulic pump is not driven even though the steering lever 22 is in the enabled state. From the time T1 onward, electrical power continues to be supplied to the controller 10 because the main switch 23 is maintained at the second position P2.

Next, the main switch 23 is switched from the second position P2 to the third position P3 and consequently the engine 7 starts at the time T7. At this time, the controller 10 disables the steering lever 22.

Next, the steering lever 22 is enabled at the time T8 in response to the lever switch 22*a* being pressed. The controller 10 disables the steering lever 22 in accompaniment to the normal stop of the engine 7 at the time T9.

The controller 10 (the lever steering control unit 40) sets the motion of the steering cylinder 9 brought about by the steering lever 22 to the disabled state when the enabled state is selected via the lever switch 22*a* and the start of the engine 7 is instructed via the main switch 23.

Therefore, when an instruction to start the engine 7 is instructed is issued, the motion of the steering cylinder 9 brought about by the steering lever 22 can be disabled whereby the occurrence of a malfunction brought about by the steering lever 22 when the engine 7 is starting can be suppressed. Moreover, because only the start of the engine 7 is used as a trigger and the traveling state of the wheel loader 1 or the operating state of the engine 7 and the like do not need to be monitored, the disabling of the steering lever 22 can be performed easily.

When the engine 7 is stopped when the enabled state is selected via the lever switch 22*a*, the controller 10 maintains the motion of the steering cylinder 9 brought about by the steering lever 22 in the enabled state until the main switch 23 is switched from the second position P2 to the third position P3.

Therefore, operability for traveling can be improved because steering using the steering lever 22 is possible while the wheel loader 1 is traveling due to inertia after the engine 7 has stopped.

Second Exemplary Embodiment

Figure 7:
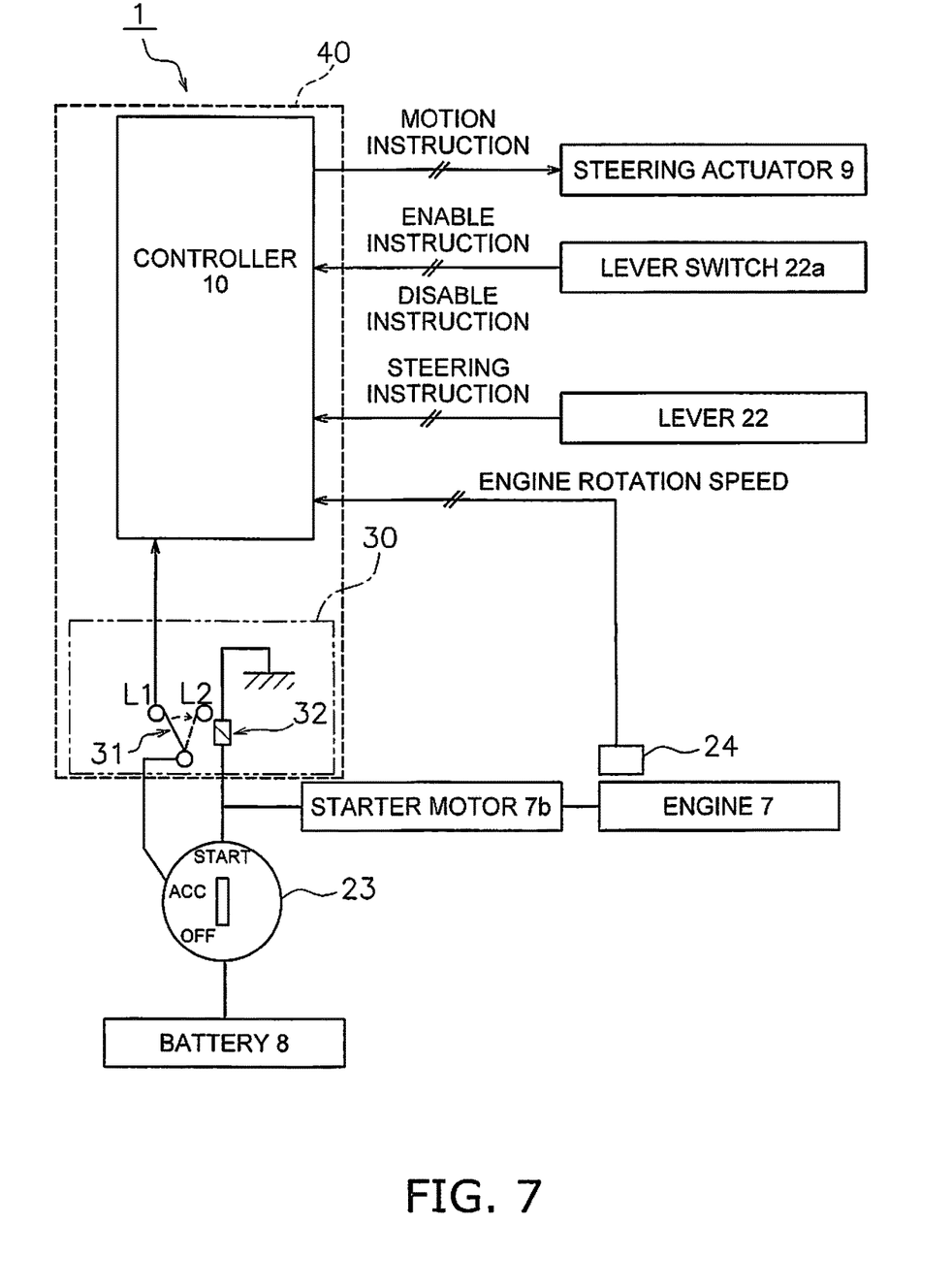
FIG. 7 is a block diagram illustrating the configuration of the wheel loader according to a second exemplary embodiment.

A second exemplary embodiment of the present invention shall be explained below in detail with reference to the figures. FIG. 7 is a block diagram for explaining a configuration of the wheel loader 1. The difference between the second exemplary embodiment and the first exemplary embodiment is that a relay circuit 30 is provided between the controller 10 and the main switch 23. Therefore, the differences between the first and second exemplary embodiments will be mainly discussed below.

The relay circuit 30 is configured by a switch 31 and a coil 32. The switch 31 is connected to the controller 10 and the second position P2 of the main switch 23. The switch 31 can be switched between an operation position L1 and a non-operation position L2. The switch 31 is biased toward the operation position L1 and thus normally is in the operation position L1.

The coil 32 is electrically connected to the third position P3 of the main switch 23. The coil 32 is located adjacent to the switch 31. When the main switch 23 is switched to the third position P3 and the instruction for starting engine 7 is issued, the starter motor 7b is energized and the coil 32 is also energized. Consequently, the switch 31 is drawn toward the coil 32 and switches to the non-operation position L2 whereby the supply of electrical power from the battery 8 to the controller 10 is shut off. At the same time that the supply of electrical power to the controller 10 is shut off, the steering lever 22 is automatically disabled.

Thereafter, when the main switch 23 is switched from the third position P3 back to the second position P2, the energization of the coil 32 is shut off whereby the switch 31 returns to the operation position L1 due to the biasing force. At this time, although the supply of electrical power to the controller 10 is recovered, the steering lever 22 is maintained in the disabled state.

The controller 10 and the relay circuit 30 in the present exemplary embodiment are configured by the lever steering control unit 40. The lever steering control unit 40 is provided with the relay circuit 30 for shutting off the electrical power supplied from the battery 8 to the controller 10 when the main switch 23 is switched from the second position P2 to the third position P3.

The lever steering control unit 40 is provided with the relay circuit 30 for shutting off the electrical power supplied from the battery 8 to the controller 10 when the main switch 23 is switched from the second position P2 to the third position P3.

Therefore, because the steering lever 22 is automatically disabled by the relay circuit 30 when the instruction for starting the engine 7 is issued, there is no need to cause the controller 10 to separately perform the processing to disable the steering lever 22.

What is claimed is:
1. A work vehicle comprising:
a steering lever;
an engine;
a main switch configured to instruct an engine start;
a rear frame;
a front frame rotatably attached to the rear frame;
a steering actuator attached between the front frame and the rear frame and configured to move in response to an operating state of the steering lever;
a lever switch configured to allow an operator to select between an enabled state and a disabled state of the steering lever, the enabled state being a state in which the steering actuator moves in response to the operating state of the steering lever and the disabled state being a state in which the steering actuator does not move in response to the operating state of the steering lever; and
a lever steering control unit configured to set the steering lever to the disabled state when the engine start is instructed via the main switch regardless of whether the enabled state or the disabled state is selected by the lever switch.

2. The work vehicle according to claim 1, wherein
the main switch is configured to allow the selection of any of a first position in which electrical power is not supplied to the lever steering control unit, a second position in which electrical power is supplied to the lever steering control unit, and a third position in which the engine start is instructed; and
when the engine is stopped while the enabled state is selected via the lever switch, the lever steering control unit sets the steering lever to the disabled state when the main switch is switched from the second position to the third position.

3. The work vehicle according to claim 2, wherein
when the engine is stopped while the enabled state is selected via the lever switch, the lever steering control unit maintains a movement of the steering actuator brought about by the steering lever in the enabled state until the main switch is switched from the second position to the third position.

4. The work vehicle according to claim 3, wherein
the lever steering control unit is configured to output a motion instruction to the steering actuator in response to an operation of the steering lever,
when the lever steering control unit receives a signal for instructing the engine start, the lever steering control unit stops the output of the motion instruction to the steering actuator.

5. The work vehicle according to claim 3, further comprising
a battery connected to the main switch,
the lever steering control unit being provided with a relay circuit that shuts off electrical power supplied from the battery when the main switch is switched from the second position to the third position.

6. The work vehicle according to claim 2, wherein
the lever steering control unit is configured to output a motion instruction to the steering actuator in response to an operation of the steering lever,
when the lever steering control unit receives a signal for instructing the engine start, the lever steering control unit stops the output of the motion instruction to the steering actuator.

7. The work vehicle according to claim 2, further comprising
a battery connected to the main switch,
the lever steering control unit being provided with a relay circuit that shuts off electrical power supplied from the battery when the main switch is switched from the second position to the third position.

* * * * *